United States Patent [19]
Davis et al.

[11] 3,912,036
[45] Oct. 14, 1975

[54] INSTRUMENT PANEL PAD WITH INTEGRAL DUCT SEAL

[75] Inventors: Thomas John Davis, Union Lake; Daniel Anthony Jannette, Washington, both of Mich.

[73] Assignee: General Motors Corporation, Detroit, Mich.

[22] Filed: Nov. 21, 1974

[21] Appl. No.: 525,883

[52] U.S. Cl. ............................................. 180/90
[51] Int. Cl.² ..................................... B60K 37/00
[58] Field of Search ............... 180/90; 280/150 AB

[56] References Cited
UNITED STATES PATENTS
3,602,327   8/1971   Barenyi ............................... 180/90

*Primary Examiner*—David Schonberg
*Assistant Examiner*—Terrance L. Siemens
*Attorney, Agent, or Firm*—C. E. Leahy

[57] ABSTRACT

An integral duct seal is molded insitu on an instrument panel pad. A vinyl skin and a rigid plastic insert are placed in a mold and define a cavity therebetween. The insert has a wall having an opening therein which registers generally with the desired location of an air outlet. The mold has a wall which is spaced behind the wall of the insert to provide a mold cavity between the wall of the insert and the wall of the mold. Uncured urethane foam is poured into the mold and in cured condition fills the cavity between the skin and the insert and the mold cavity behind the wall of the insert. The instrument panel pad is then removed from the mold and the outlet opening provided therein by diecutting through the skin and the urethane foam. The dimensional extent of the die cut is preferably somewhat less than the extent of the opening in the wall of the insert so that the urethane foam located behind the wall of the insert remains integral with the urethane foam in the cavity between the insert and the skin. The air duct has a face which engages and compresses the portion of the urethane foam located behind the wall of the insert to provide an air-tight seal between the duct and the instrument panel pad.

1 Claim, 3 Drawing Figures

INSTRUMENT PANEL PAD WITH INTEGRAL DUCT SEAL

The invention relates to an instrument panel having an integral seal for an air duct, and a method for forming the seal insitu.

It is well known to provide a padded instrument panel including an instrument panel pad having a vinyl skin, a rigid insert, and a compressible urethane foam between the skin and the insert. Such an instrument panel pad has an outlet opening to which a duct communicates conditioned air. It is necessary to provide a seal between the duct and the instrument panel pad to prevent leakage of conditioned air from the interface therebetween and the attendant whistling or noise as the air escapes. In prior art, this seal is generally an annular shaped compressible plastic seal which is glued to either the duct or the insert and is then compressed between the duct and the insert as the connection therebetween is effected during assembly of the vehicle.

The present invention provides a seal which is formed insitu by the urethane foam.

According to the invention the preformed vinyl skin, which may be either vacuum formed or injection molded, is placed in a mold. The insert, preferably an injection molded rigid plastic, is also placed in the mold and has a wall having an opening therein which registers with the desired location of the air outlet. The mold has a wall which is spaced from the wall of the insert by a distance equal to the desired thickness of the urethane foam seal to be formed insitu as part of the instrument panel pad. The uncured urethane foam is poured or injected into the cavity between the skin and the insert. The urethane foam rises and flows through the opening in the insert and is cured insitu behind the wall of the insert. The instrument panel pad is then removed from the mold and the outlet opening is provided therein by die cutting through the skin and the urethane foam. The dimensional extent of the die cut is preferably somewhat less than the extent of the opening in the wall of the insert so that the urethane foam located behind the wall of the insert remains integral with the urethane foam in the cavity between the insert and the skin. The air duct has a face which engages and compresses the portion of the urethane foam located behind the wall of the insert to provide an air-tight seal. The dimensional extent of the face of the duct is preferably greater than the extent of the opening in the wall of the insert so that the foam is compressed against the wall of the insert, even in the event of minor misalignment between the duct and the instrument panel pad.

One feature of the invention is the provision of a novel method of forming an integral insitu seal about an air outlet opening of a padded instrument panel.

A second feature of the invention is the provision of an instrument panel pad having an insitu formed integral seal for effecting an air-tight connection between an air outlet opening in the instrument panel pad and an air distribution duct.

These and other features and advantages of the invention will become apparent upon consideration of the specification and the appended drawings in which.

Figure 1:
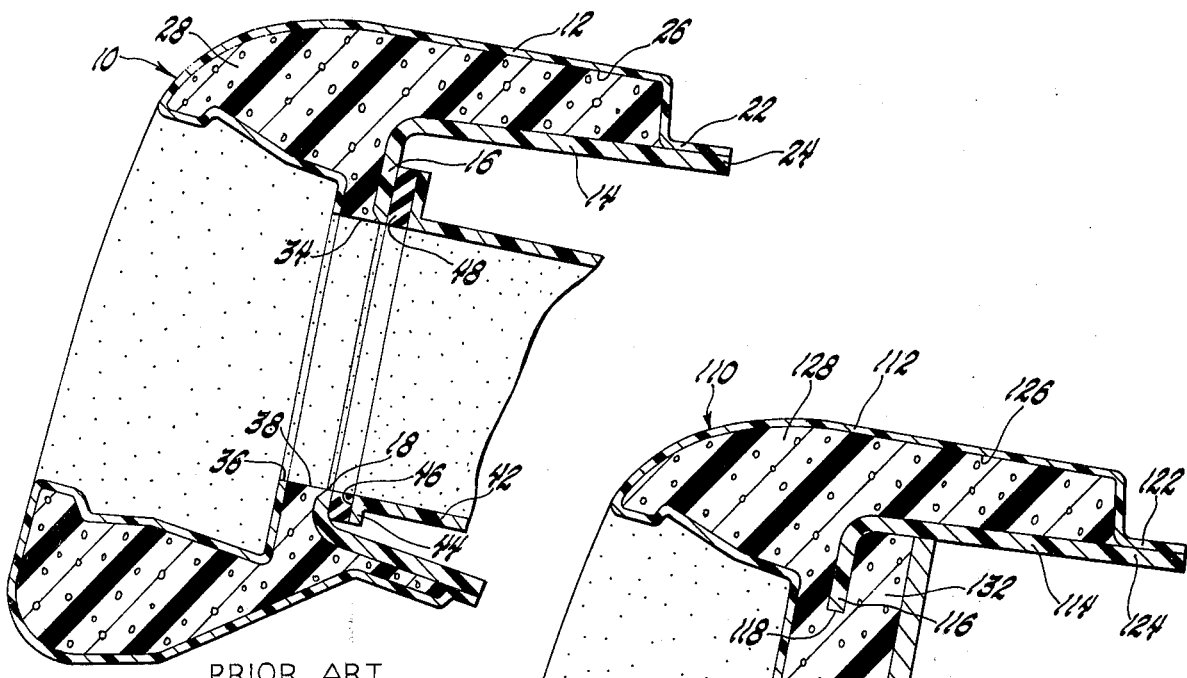
FIG. 1 is a cross section through an instrument panel pad of the prior art.

Referring to FIG. 1, a prior art instrument panel pad and air duct are shown. The instrument panel pad assembly indicated generally at 10 includes a vinyl skin 12 which is vacuum formed or injection molded polyvinyl chloride. The vinyl skin 12 has a decorative grain on its surface to provide a pleasing appearance. Structural rigidity is provided to the instrument panel pad assembly 10 by an insert 14 which is preferably injection molded plastic. The insert 14 has a wall 16 which has an opening 18 therein at the desired location of an air outlet. The skin 12 and insert 14 are loaded into a mold which engages and supports the vinyl skin 12 and the insert 14 and pinches together the peripheral edge 22 of the vinyl skin 12 and the peripheral edge 24 of the insert 14. Uncured urethane foam is then injected or poured into the cavity 26 between the vinyl skin 12 and the insert 14, preferably through a hole, not shown, in the insert 14. As the urethane foam 28 cures, it expands to completely fill the cavity 26. It will be apparent that the cured urethane foam 28 and vinyl skin 12 provide a cushioned surface. An outlet opening 34 is provided in the instrument panel pad 10 in registered relation with the opening 18 in the wall 16 of the insert. The outlet opening 34 is preferably provided by a die-cutting operation in which an opening 36 is provided in the vinyl skin 12 and an opening 38 is provided in the urethane foam 28. An alternative method of providing the air outlet 34 is to provide a vinyl skin 12 having the opening 36 preformed therein and to utilize a mold, not shown, which projects through the opening 18 of the wall 16 and through the opening 36 of the vinyl skin 12 to prevent the uncured urethane foam from flowing into that area which is to be the air outlet opening 34. A conventional rigid plastic air duct 42 is aligned with the opening 18 in the wall 16 of the insert to communicate conditioned air to the air outlet 34 of the instrument panel pad 10. The duct 42 has a laterally extending flange 44 about its periphery which provides an abutment face 46 on the end of the duct 42. An annular seal 48 of compressible plastic material or the equivalent is glued to either the face 46 of the duct 42 or the wall 16 of the insert 14. The annular seal 48 is compressed between the wall 16 and the face 46 of the duct 42 when the instrument panel pad 10 and the duct 42 are assembled. Compression of the annular seal 48 assures against leakage of air through the interface between the duct 42 and the insert 14.

Figure 2:
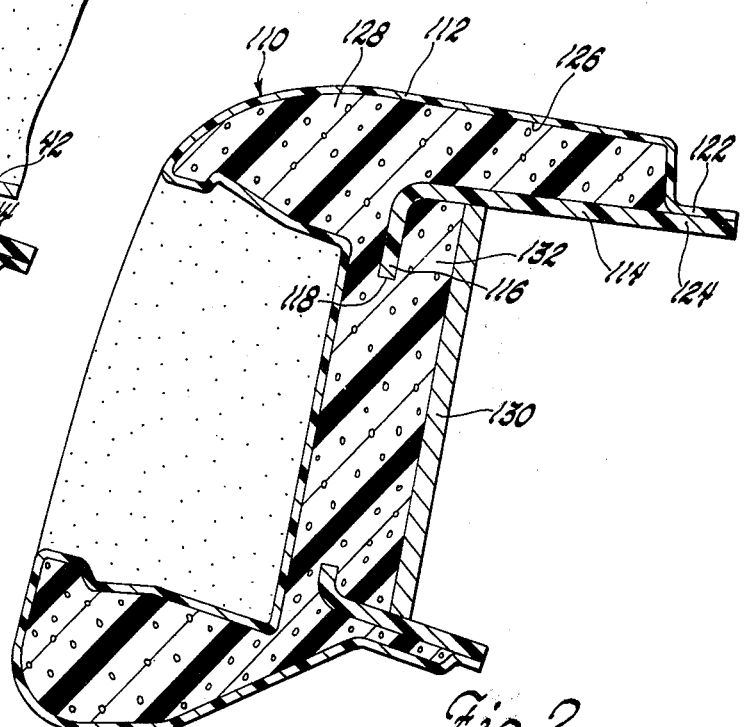
FIG. 2 is a cross sectional view of the instrument panel pad showing the method of making the instrument panel pad.

FIG. 2 shows the method of molding an instrument panel pad according to the invention. The vinyl skin 112 and the insert 114 are loaded into a mold, not shown. The insert 114 is of injected molded plastic and has an opening 118 therein which registers generally with the desired location of the air outlet opening. The mold pinches together the edge portion 122 of the vinyl skin 112 and the edge portion 124 of the insert 114. Uncured urethane foam 128 in its liquid state is poured into the cavity 126 between the vinyl skin 112 and the insert 114. The mold has a wall 130 which is spaced behind the wall 116. As the urethane foam 128 rises and is cured, it flows through the opening 118 in the wall 116 of the insert 114 so that urethane foam 132 is provided behind the wall 116.

When the urethane foam 128 has properly cured, the instrument panel pad 110 is removed from the mold.

Figure 3:
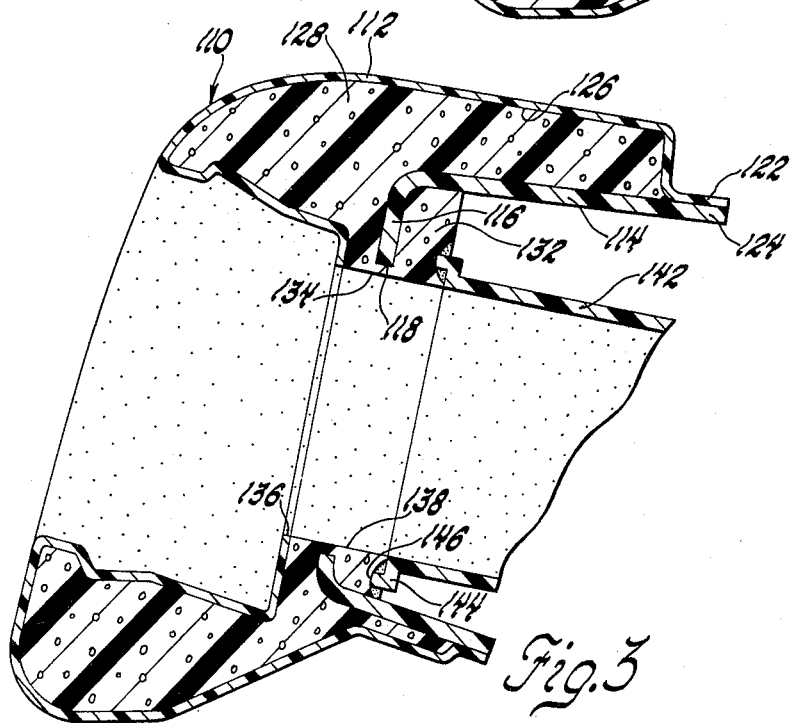
FIG. 3 is a cross sectional view of the finished instrument panel pad installed in the vehicle and engaged by the air duct.

Referring to FIG. 3, a die-cutting operation is utilized to form the outlet opening 134. This die-cutting operation provides an opening 136 in the skin 112 and an opening 138 through the urethane foam 128. The dimensional extent of the outlet opening 134 is somewhat less than the dimensional extent of the opening 118 in the insert 114 so that the urethane foam 132 behind the wall 116 remains unitary with the urethane foam 128 in the cavity 126 between the skin 112 and the insert 114. The urethane foam material remaining in the opening 118 assures retention of the urethane foam 132.

As seen in FIG. 3, the duct 142 has an interior dimension equal in extent to the opening 134 but is outwardly offset at 144 to provide an abutment face 146 for engaging the urethane foam 132. The face 146 is disposed at a greater dimension than the hole 118 in the wall 116 to assure that the urethane foam 132 is compressed against the wall 116 instead of tending to extrude the urethane foam through the opening 118. Thus, it is seen that the urethane foam 132 provides an integral duct seal which is formed insitu as a unitary part of the instrument panel pad. It will be apparent that economies of manufacture and assembly are effected by the elimination of the separately formed annular seal 48 of FIG. 1 and the assembly operation of gluing such an annular seal 48 to the duct or the insert.

What is claimed is:

1. A padded instrument panel and duct assembly comprising: a vinyl skin, a rigid insert member spaced from the skin and having a wall with an opening therein, compressible foam filling the space between the skin and the insert member, the compressible foam also being located behind the wall of the insert member, an opening in the skin and the compressible foam registering generally with the opening in the wall of the insert member, the opening in the skin and the foam being lesser in dimension than the opening in the wall of the insert member so that the compressible foam on both sides of the wall of the insert member is unitary to mount the foam behind the wall of the insert member, and a duct located behind the wall and registering with the opening in the compressible foam, the duct having a face engaging and compressing the compressible foam against the wall of the insert member to form an air-tight seal therewith.

* * * * *